United States Patent
Seo et al.

(10) Patent No.: US 8,631,349 B2
(45) Date of Patent: Jan. 14, 2014

(54) APPARATUS AND METHOD FOR CHANGING APPLICATION USER INTERFACE IN PORTABLE TERMINAL

(75) Inventors: Suck-Ho Seo, Yongin-si (KR); Young-June Woo, Hwaseong-si (KR)

(73) Assignee: Samsung Electronics Co., Ltd (KR)

( * ) Notice: Subject to any disclaimer, the term of this patent is extended or adjusted under 35 U.S.C. 154(b) by 982 days.

(21) Appl. No.: 12/127,444

(22) Filed: May 27, 2008

(65) Prior Publication Data
US 2008/0295027 A1   Nov. 27, 2008

(30) Foreign Application Priority Data
May 25, 2007  (KR) .................. 10-2007-0050699

(51) Int. Cl.
    G06F 3/048   (2013.01)
(52) U.S. Cl.
    USPC ........................................... 715/810
(58) Field of Classification Search
    USPC ........................................... 715/810
    See application file for complete search history.

(56) References Cited

U.S. PATENT DOCUMENTS

| | | | |
|---|---|---|---|
| 6,687,745 B1* | 2/2004 | Franco et al. | 709/219 |
| 2005/0009571 A1* | 1/2005 | Chiam et al. | 455/566 |
| 2005/0050474 A1* | 3/2005 | Bells et al. | 715/747 |
| 2005/0075537 A1* | 4/2005 | Chen et al. | 600/109 |
| 2006/0150125 A1* | 7/2006 | Gupta et al. | 715/864 |
| 2007/0229531 A1* | 10/2007 | Park et al. | 345/589 |
| 2007/0293248 A1* | 12/2007 | Kim et al. | 455/466 |
| 2008/0009325 A1* | 1/2008 | Zinn et al. | 455/566 |
| 2008/0215999 A1* | 9/2008 | Kim et al. | 715/762 |

FOREIGN PATENT DOCUMENTS

| | | |
|---|---|---|
| KR | 1020040006883 | 1/2004 |
| KR | 1020060078775 | 7/2006 |

* cited by examiner

*Primary Examiner* — Sara England
*Assistant Examiner* — Angie Badawi
(74) *Attorney, Agent, or Firm* — The Farrell Law Firm, P.C.

(57) ABSTRACT

A method for changing an application User Interface (UI) in a portable terminal using menu theme information is provided. UI theme information contained in menu theme information is loaded, a main window image is selected from the loaded UI theme information, and theme index table information is selected. A user interface consistent with a menu UI is created using the selected theme index table information and the selected main window image. The created user interface is stored as a basic interface. The created user interface is applied and displayed.

9 Claims, 7 Drawing Sheets

APPARATUS AND METHOD FOR CHANGING APPLICATION USER INTERFACE IN PORTABLE TERMINAL

PRIORITY

This application claims priority under 35 U.S.C. §119 to an application filed in the Korean Intellectual Property Office on May 25, 2007 and assigned Serial No. 2007-50699, the contents of which are incorporated herein by reference.

BACKGROUND OF THE INVENTION

1. Field of the Invention

The present invention relates generally to changing an application User Interface (UI), and in particular, to an apparatus and method for changing an application UI in a portable terminal.

2. Description of the Related Art

Conventional portable terminals have no choice but to simply use menus provided by terminal manufacturers, and thus cannot satisfy the demands of users desiring to use individually customized menus. To solve this problem, there have been methods for allowing users to change backgrounds and icons into desired ones for change of portable terminal menu UIs.

The UI themes of portable terminals are broadly classified into two types: a menu UI and a program UI.

A menu UI includes a main menu and a menu tree as well as an idle screen displayed when a portable terminal is powered on. In general, a program UI is called an application UI.

It is easy to change a menu UI. However, changing an application UI necessitates changing an application architecture and using a suitable program code and a markup language such as an eXtensible Markup Language (XML).

The menu interface has a menu relationship script describing the relationship between a menu theme file and a menu screen and thus makes it possible to change names, icons and backgrounds of menus. However, the application UI is relatively difficult to change, and cannot maintain the total consistency between menus, if changed.

SUMMARY OF THE INVENTION

The present invention is provided to solve at least the above problems and/or disadvantages and to provide at least the advantages below. Accordingly, an object of the present invention is to provide an apparatus and method for changing an application UI in a portable terminal.

Another object of the present invention is to provide an apparatus and method for overcoming the lack of consistency between a menu UI and an application UI when changing a menu in a portable terminal.

Still another object of the present invention is to provide an apparatus and method for overcoming a difficulty in changing an application UI for change of a menu using a theme information, while minimizing the change of a program code.

Even another object of the present invention is to provide an apparatus and method for changing an application UI in consistency with a menu UI in a portable terminal by adding application UI theme information in a menu theme information, According to one aspect of the present invention, a method for changing an application UI in a portable terminal using a menu theme information includes loading UI theme information contained in menu theme information; selecting a main window image from the loaded UI theme information; selecting theme index table information; creating a user interface consistent with a menu UI using the selected theme index table information and the selected main window image; storing the created user interface as a basic interface.

According to another aspect of the present invention, a portable terminal capable of changing an application UI using a menu theme information includes a wireless unit for communicating with another node and receiving a UI theme information, and a controller for loading UI theme information contained in menu theme information; selecting a main window image from the loaded UI theme information using a key input unit; selecting theme index table information using the key input unit; creating a user interface consistent with a menu UI using the selected theme index table information and the selected main window image; storing the created user interface as a basic interface in a memory unit; and displaying the created user interface on a display unit.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides an apparatus and method for changing an application User Interface (UI) in a portable terminal.

Figure 1:
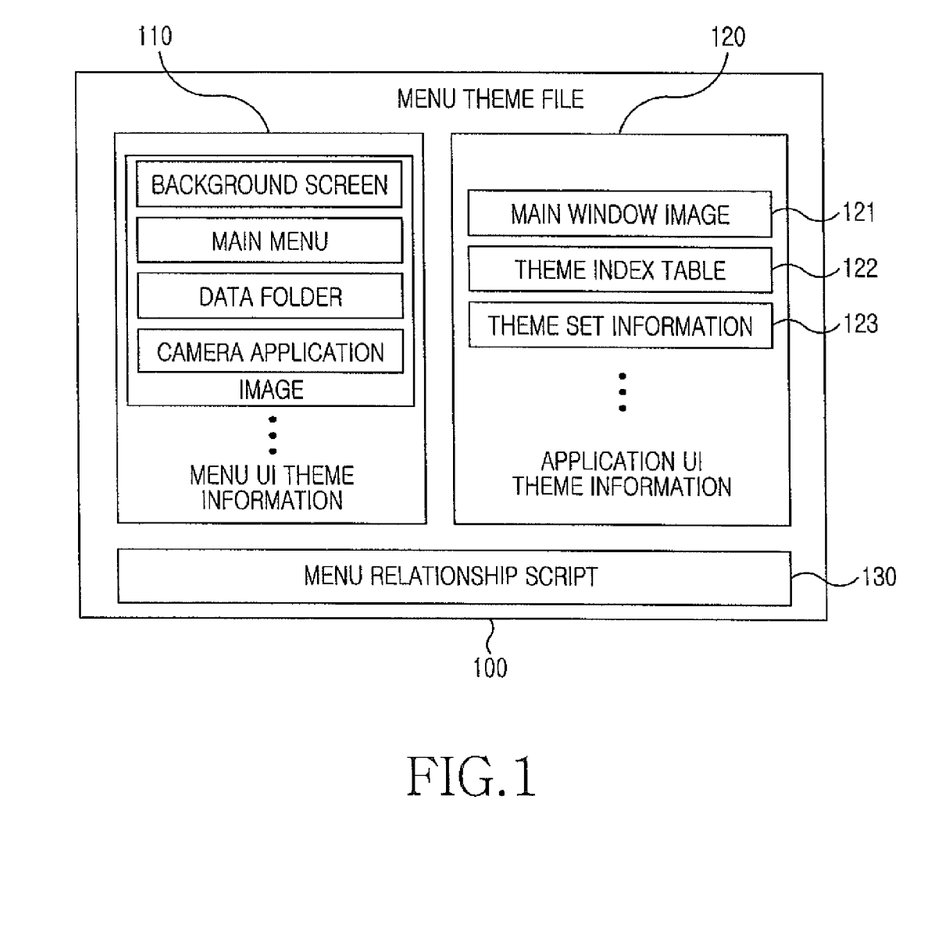
FIG. 1 is a diagram illustrating a menu theme file according to the present invention.

FIG. 1 is a diagram illustrating a menu theme file according to an embodiment of the present invention.

Referring to FIG. 1, a menu theme file 100 includes menu UI theme information 110, application UI theme information 120, and a menu relationship script 130.

The menu UI theme information 110 includes image resources such as an icon and a background image of each menu.

The application UI theme information 120 includes a main window image 121, which is defined by basic images constituting an application UI, such as Widget, Winset, and Frame, a theme index table 122, which is defined by font images, icons or color theme information corresponding to a main window image, and theme set information 123.

Figure 2:
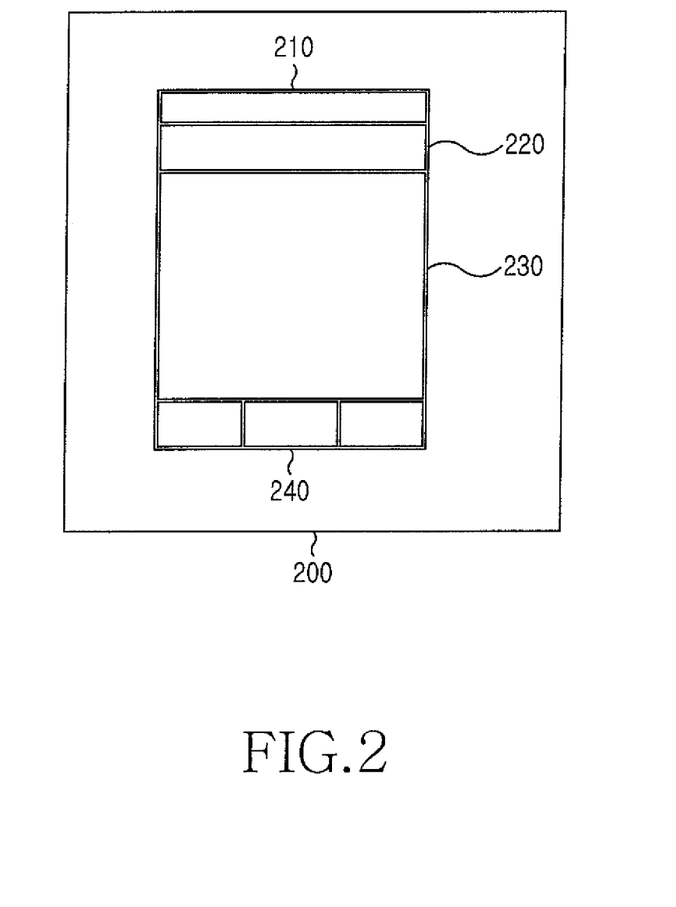
FIG. 2 is a diagram illustrating an application window image according to the present invention.

The theme index table 122 includes a variety of theme index tables of fonts, lines, and backgrounds corresponding to an application window image 200 illustrated in FIG. 2.

Figure 3:
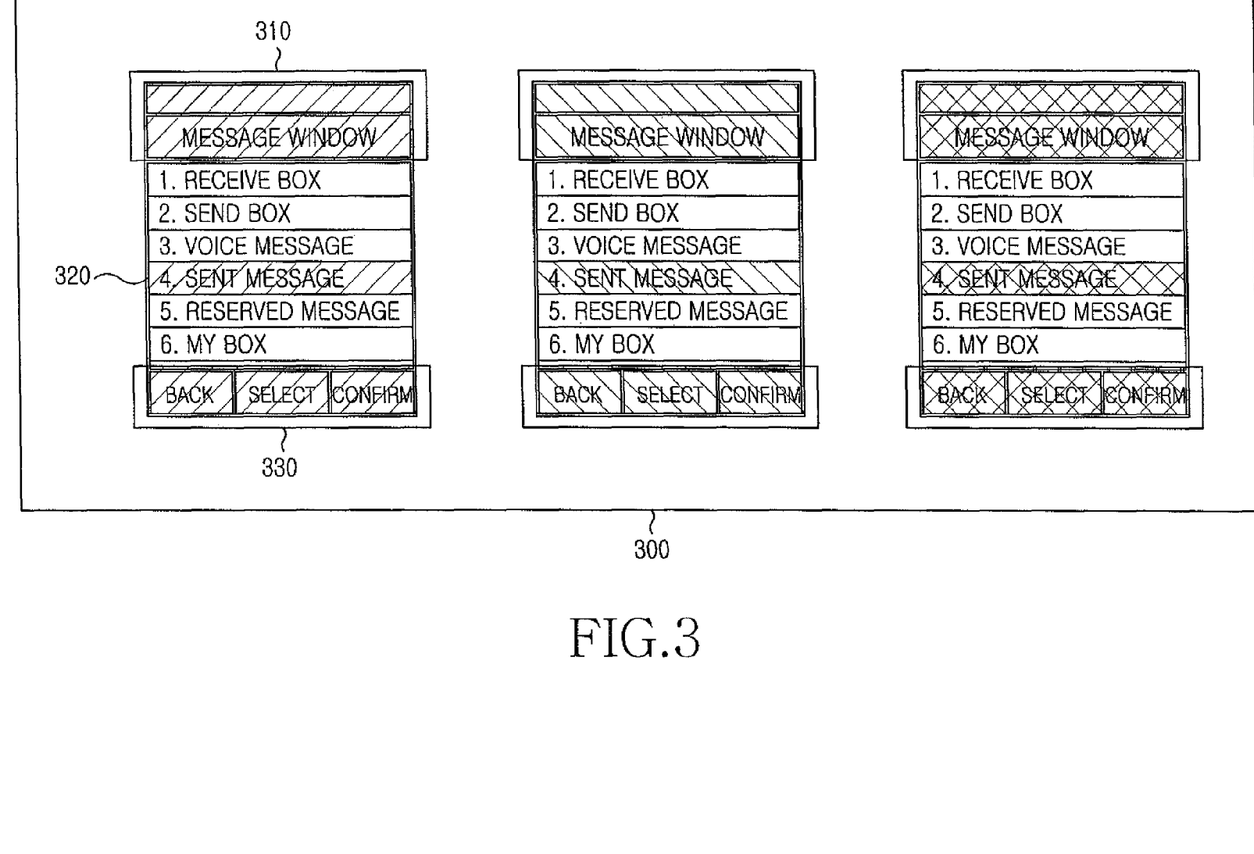
FIG. 3 is a diagram illustrating an example of a theme set according to the present invention.

The theme set information 123 indicates which theme set is selected from a menu theme set 300 according to an embodiment illustrated in FIG. 3. The theme set information 123 is constructed with one image as the application window image 200 of FIG. 2, which includes detailed elements 210, 220, 230 and 240, which may be different colors or image themes.

For example, in the menu theme set 300, the color of a font in a message box 310 may be different from the color of a font in a sent message 320.

Figure 4:
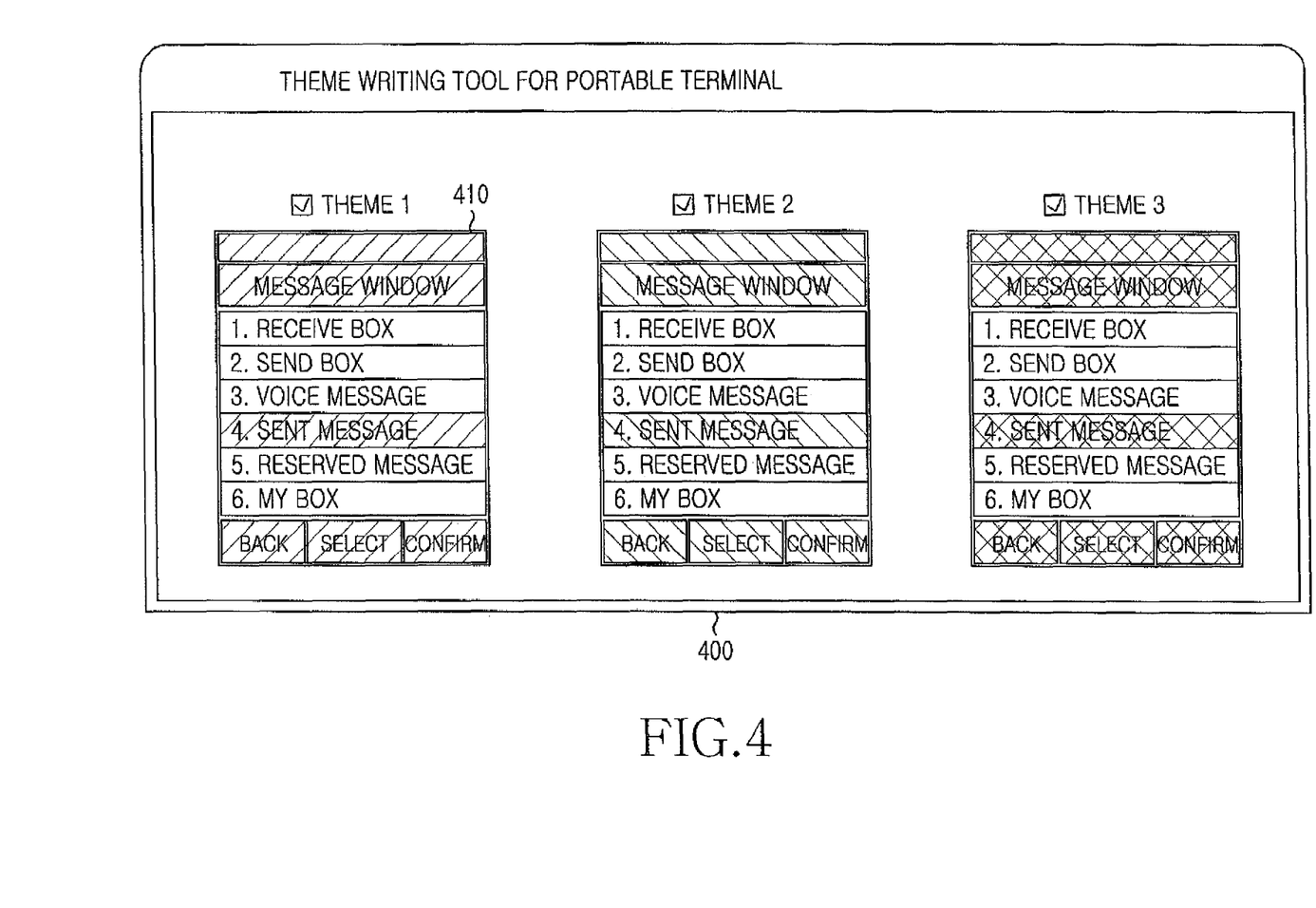
FIG. 4 is a diagram illustrating a first screen of a portable terminal theme writing tool according to the present invention.
Figure 5:
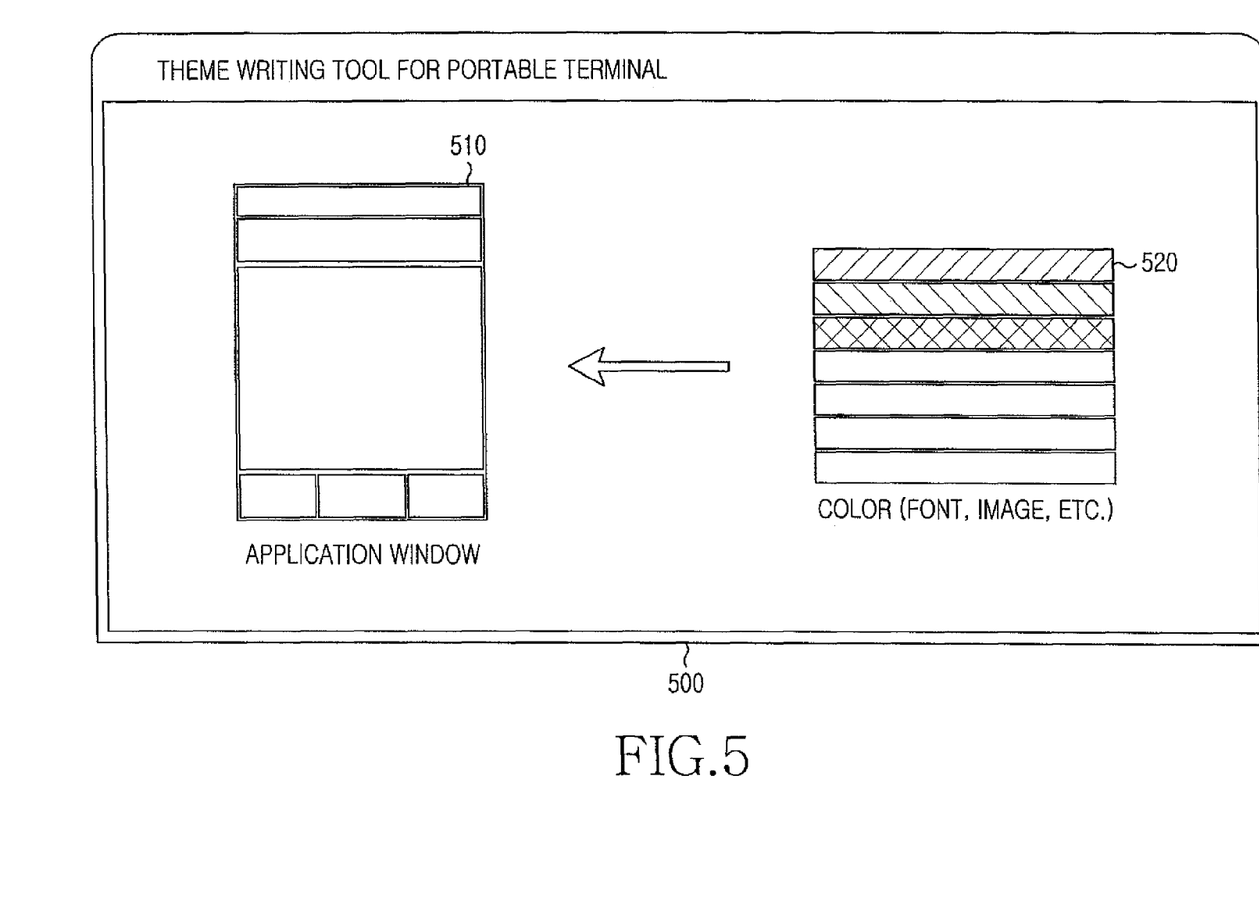
FIG. 5 is a diagram illustrating a first screen of a portable terminal theme writing tool according to the present invention.

A PC tool or a Web tool may be used to create the menu theme file 100. In this case, a menu set 410 of a portable terminal may be selected as illustrated in FIG. 4 and a user color table 520 may be used to implement a main window image 510 as illustrated in FIG. 5.

A user desiring to change an application UI of a portable terminal may create a menu using a theme writing tool 400 or 500. A general user or a designer uses the theme writing tool 400 or 500 to change an application UI.

Also, UI images suitable for respective points of a portable terminal may be selected and the selected images are displayed for the corresponding points on the portable terminal. Herein, the corresponding points may be an idle screen, a main menu screen, and a background screen of a second menu screen.

The theme information 100 created using the above tool may be downloaded from a WAP server by a user and may be stored and set in the user's portable terminal. Herein, the setting means the start of a program operation for reading theme information file and displaying the theme information on the portable terminal according to circumstances.

When it is set, the theme information file may be used to the application UI, color, font, and screen of the portable terminal. The theme writing tool 400 for writing the theme information 120 may include a Web browser tool as well as a PC tool.

The theme information of the present invention may be created in the following three methods. In the first method, a theme set 410 is selected by a tool provider (or a terminal manufacturer) as illustrated in FIG. 4. In the second method, a main window 510 is created by a user using a color 520 or an image. In the third method, a theme color (or a theme such as a font or an image) is automatically extracted from each image of the menu UI theme information 110 to create the application window image 510.

In the second and third methods, the theme index table 122 is created based on an application image. The theme index table 122 includes theme indexes such as color, font, and image and is defined with respect to all things constituting an application UI. For example, based on values of contrast and complement, a theme index value of color is selected to be well suitable for the application window image 200.

Figure 6:
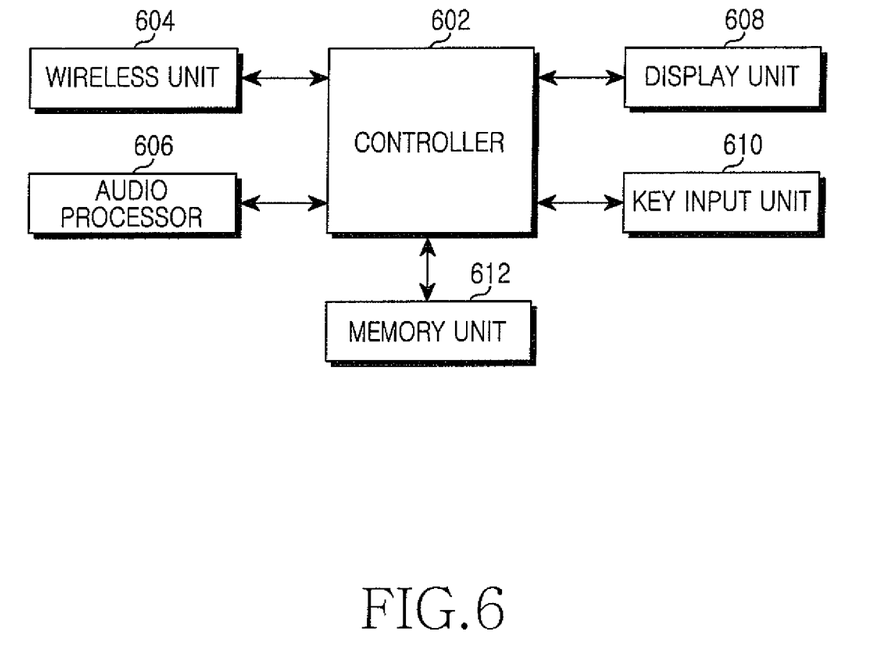
FIG. 6 is a block diagram of a portable terminal according to the present invention.

FIG. 6 is a block diagram of a portable terminal according to an embodiment of the present invention.

Referring to FIG. 6, the portable terminal includes a controller 602, a wireless unit 604, an audio processor 606, a display unit 608, a key input unit 610, and a memory unit 612.

The controller 602 controls an overall operation of the portable terminal. For example, the controller 602 controls voice communication and data communication. According to the present invention, the controller 602 sets a theme of the portable terminal by loading a menu UI interface information and an application UI interface information, such as the menu UI interface information 110 and the application UI interface information 120, that are contained in a theme file.

In addition to performing a general wireless communication function, the wireless unit 604 wirelessly receives a UI theme file and provides the received UI theme file to the controller 602.

The audio processor 606 converts audio data into audible sound using a speaker. Also, the audio processor 606 converts an audio signal received from a microphone into audio data using a codec.

The display unit 608 displays selection settings for a menu and a selected menu according to the present invention. The display unit 608 may be a Liquid Crystal Display (LCD).

The key input unit 610 may include alphanumeric keys. The key input unit 610 is used as an input unit for selecting a theme menu.

The memory unit 612 are used to store programs and data. According to the present invention, the memory unit 612 stores theme set information, a window image, and a resource image contained in the theme menu.

Figure 7:
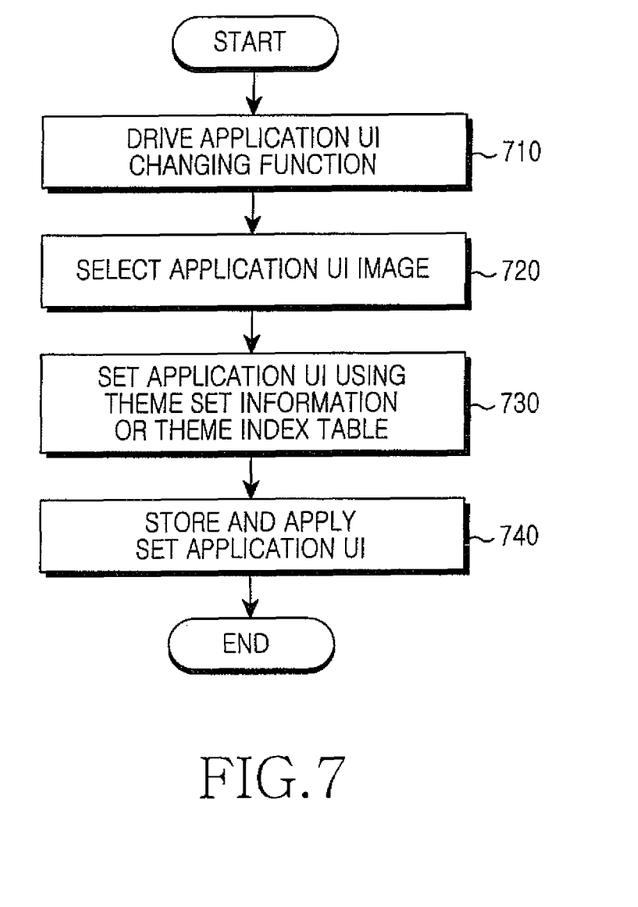
FIG. 7 is a flowchart illustrating a procedure for changing an application UI according to the present invention.

FIG. 7 is a flowchart illustrating a procedure for changing an application UI according to an embodiment of the present invention.

Referring to FIG. 7, an application UI changing procedure is driven by a user (or a designer) in step 710. In step 720, an application UI image is selected by the user.

In step 730, based on the selected application UI image, an application UI is set using a theme index table as illustrated in FIG. 5. In step 740, the set application UI is stored and applied. Thereafter, the application UI changing procedure is ended.

When the theme set information of FIG. 4 is selected and used in step 730, step 720 can be omitted.

As described above, the present invention makes it possible to overcome the lack of consistency between the menu UI and the application UI without the change of an application UI code, when changing the menu UI.

Alternate embodiments of the present invention can also comprise computer readable codes on a computer readable medium. The computer readable medium includes any data storage device that can store data that can be read by a computer system. Examples of a computer readable medium include magnetic storage media (such as ROM, floppy disks, and hard disks, among others), optical recording media (such as CD-ROMs or DVDs), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for changing an application User Interface (UI) in a portable terminal using a menu theme information, the method comprising:

loading UI theme information contained in menu theme information;

selecting a main window image from the loaded UI theme information;

selecting theme index table information, wherein the theme index table information includes a plurality of tables of colors, fonts, lines, and backgrounds;

creating the application UI consistent with a menu UI using the selected theme index table information and the selected main window image, wherein the menu UI is a main menu and a menu tree as well as an idle screen displayed when a portable terminal is powered on; and, storing the created application UI as a basic interface, wherein the colors of the application UI are selected based on values of contrast and complement of the menu UI, and wherein the colors of the application UI are automatically extracted from each image of the menu theme information.

2. The method of claim 1, further comprising:

selecting a theme set after loading the UI theme information; and, storing the application UI, after selecting the theme set, which is consistent with the menu UI according to the settings of the selected theme set, as a basic interface.

3. The method of claim 2, further comprising:

automatically creating a theme index table information suitable for the selected main window image;

creating a user interface consistent with a menu UI using the automatically created theme index table information and the selected main window image; and, storing the created user interface as a basic interface.

4. The method of claim 3, wherein the theme index table information includes at least one of information of a font, a color, an icon, and a point used in the user interface.

5. A portable terminal capable of changing an application User Interface (UI) using menu theme information, the portable terminal comprising:

a wireless unit for communicating with another node and receiving a UI theme information; and a controller for loading UI theme information contained in menu theme information; selecting a main window image from the loaded UI theme information using a key input unit; selecting theme index table information using the key input unit; creating the application UI consistent with a menu UI using the selected theme index table information and the selected main window image; storing the created user interface as a basic interface in a memory unit; and displaying the created application UI on a display unit, wherein the theme index table information includes a plurality of tables of colors, fonts, lines, and backgrounds, wherein the menu UI is a main menu and a menu tree as well as an idle screen displayed when a portable terminal is powered on, wherein the colors of the application UI are selected based on values of contrast and complement of the menu UI, wherein the colors of the application UI are automatically extracted from each image of the menu theme information.

6. The portable terminal of claim 5, wherein the controller selects a theme set by the key input after loading the UI theme information; stores the application UI, after selecting the theme set, which is consistent with the menu UI according to the settings of the selected theme set, as a basic interface; and displays the user interface according to the settings of the selected theme set on the display unit.

7. The portable terminal of claim 6, wherein the controller automatically creates a theme index table information suitable for the selected main window image; creates a user interface consistent with a menu UI using the automatically created theme index table information and the selected main window image, stores the created user interface as a basic interface in the memory unit; and displays the created user interface on the display unit.

8. The portable terminal of claim 7, wherein the theme index table information includes at least one of information of a font, a color, an icon, and a point used in the user interface.

9. A non-transitory Computer-readable recording medium having recorded thereon a program for changing an application User Interface (UI) in a portable terminal using menu theme information, comprising;

a first code segment for loading UI theme information contained in menu theme information;

a second code segment for selecting a main window image from the loaded UI theme information;

a third code segment for selecting theme index table information, wherein the theme index table information includes a plurality of tables of colors, fonts, lines, and backgrounds;

a fourth code segment for creating the application UI consistent with a menu UI using the selected theme index table information and the selected main window image, wherein the menu UI is a main menu and a menu tree as well as an idle screen displayed when a portable terminal is powered on; and, a fifth code segment for storing the created application UI as a basic interface, wherein the colors of the application UI are selected based on values of contrast and complement of the menu UI, and wherein the colors of the application UI are automatically extracted from each image of the menu theme information.

* * * * *